(12) United States Patent
Sreedhar M. et al.

(10) Patent No.: US 9,921,913 B2
(45) Date of Patent: Mar. 20, 2018

(54) FLUSHING HOST CACHE DATA BEFORE REBUILDING DEGRADED REDUNDANT VIRTUAL DISK

(71) Applicant: Dell Products L.P., Round Rock, TX (US)

(72) Inventors: Deepu Syam Sreedhar M., Calicut (IN); Sandeep Agarwal, Bangalore (IN); Krishna Kumar P. K., Bangalore (IN); Sujoy Sen, Beaverton, OR (US); Somashekar Ajjampur Manjunatha, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 15/153,491

(22) Filed: May 12, 2016

(65) Prior Publication Data
US 2017/0329674 A1   Nov. 16, 2017

(51) Int. Cl.
G06F 11/00     (2006.01)
G06F 11/10     (2006.01)
G06F 12/128    (2016.01)
G06F 12/0831   (2016.01)
G06F 12/0868   (2016.01)

(52) U.S. Cl.
CPC ...... *G06F 11/1092* (2013.01); *G06F 11/1084* (2013.01); *G06F 12/0833* (2013.01); *G06F 12/0868* (2013.01); *G06F 12/128* (2013.01); G06F 2211/1009 (2013.01); G06F 2212/224 (2013.01); G06F 2212/621 (2013.01); G06F 2212/69 (2013.01)

(58) Field of Classification Search
CPC .................................................. G06F 11/1084
See application file for complete search history.

(56) References Cited

U.S. PATENT DOCUMENTS

| 7,650,475 | B2 * | 1/2010 | Suzuki | G06F 11/1471 |
| | | | | 711/161 |
| 7,673,096 | B2 * | 3/2010 | Aoyama | G06F 3/0619 |
| | | | | 711/112 |
| 7,873,600 | B2 * | 1/2011 | Murayama | G06F 3/0665 |
| | | | | 707/640 |
| 8,943,359 | B2 * | 1/2015 | Tiwari | G06F 11/2094 |
| | | | | 714/6.1 |
| 2007/0220313 | A1 * | 9/2007 | Katsuragi | G06F 11/0727 |
| | | | | 714/6.22 |
| 2007/0300034 | A1 * | 12/2007 | Aoyama | G06F 3/0619 |
| | | | | 711/170 |

(Continued)

*Primary Examiner* — Christopher S McCarthy
(74) *Attorney, Agent, or Firm* — Jackson Walker L.L.P.

(57) ABSTRACT

A storage management method includes receiving a degrade signal indicating a degraded state of a virtual disk associated with a host system. Rebuild-flush operations may be performed. The operations may include writing, to the virtual disk and also to a hot spare drive (HSP) associated with the virtual disk, valid-modified data, stored in a host storage cache, associated with the virtual disk. In contrast, valid-unmodified storage cache data associated with the virtual disk, may be written to the HSP only. After the rebuild-flush completes, the virtual disk may be rebuilt. During rebuild, however, any cached-LBA may be skipped where traditional RAID rebuild operations are performed for un-cached LBAs only.

20 Claims, 5 Drawing Sheets

(56) References Cited

U.S. PATENT DOCUMENTS

| | | | | |
|---|---|---|---|---|
| 2009/0125680 A1* | 5/2009 | Ninose | ............... | G06F 3/0608 |
| | | | | 711/114 |
| 2011/0191538 A1* | 8/2011 | Maeda | ............... | G06F 12/16 |
| | | | | 711/114 |
| 2014/0025990 A1* | 1/2014 | Akutsu | ............... | G06F 11/1092 |
| | | | | 714/6.22 |
| 2017/0004047 A1* | 1/2017 | Deshmukh | ............... | G06F 11/1448 |

* cited by examiner

| HASH TABLE FOR DEGRADED VHD VALID-UNMODIFIED DATA ||
|---|---|
| LBA | CACHE LINE ADDRESS |
|  |  |
|  |  |
|  |  |
|  |  |

301-1

| HASH TABLE FOR DEGRADED VHD VALID-MODIFIED DATA ||
|---|---|
| LBA | CACHE LINE ADDRESS |
|  |  |
|  |  |
|  |  |
|  |  |

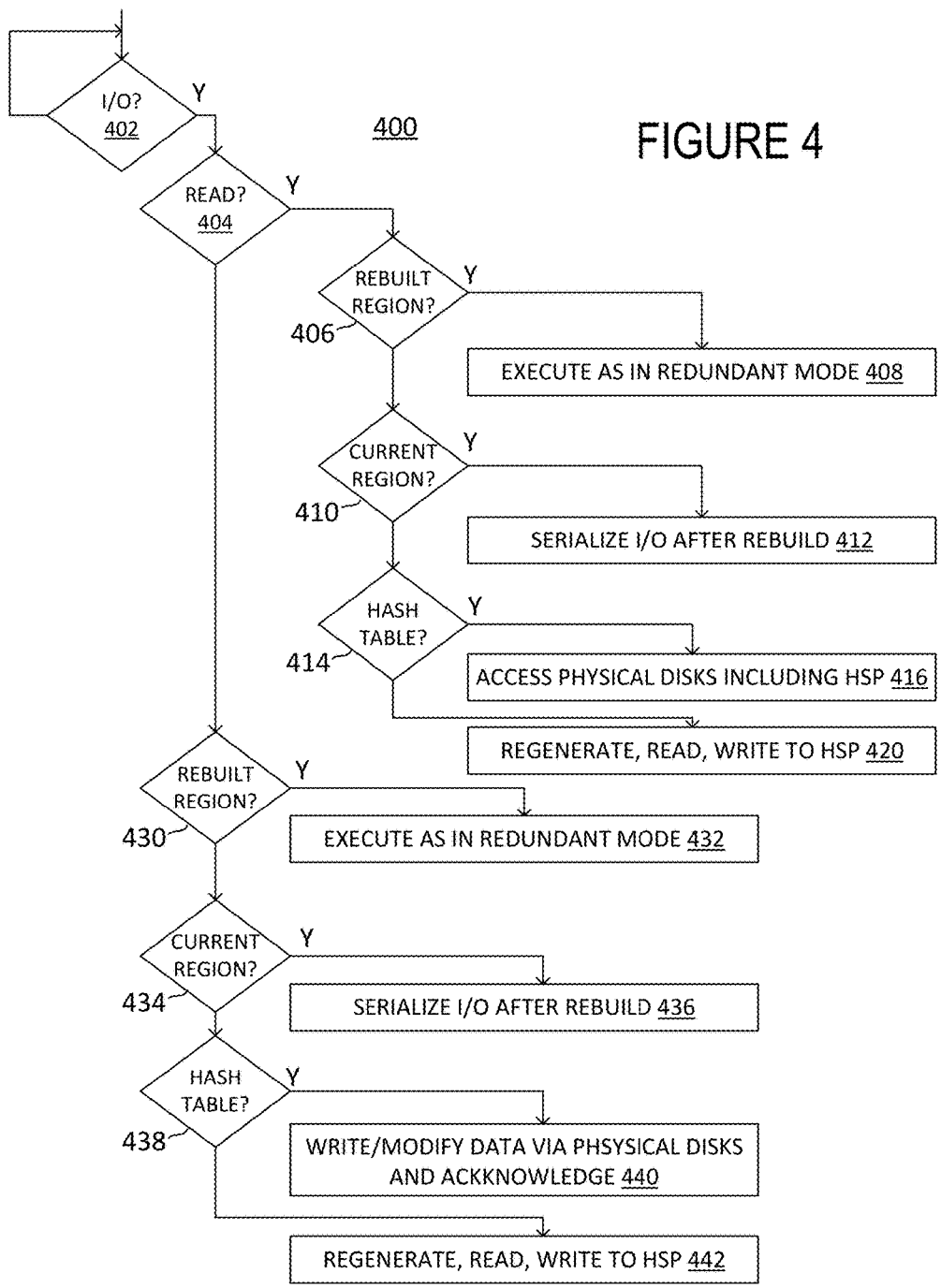

FLUSHING HOST CACHE DATA BEFORE REBUILDING DEGRADED REDUNDANT VIRTUAL DISK

TECHNICAL FIELD

Disclosed subject matter is in the field of data storage systems and methods and, more particularly, data storage systems employing a RAID controller and a hot spare drive.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

The data storage systems of at least some information handling systems employ redundant array of independent drives (RAID) technology to enable the widespread use of low cost persistent mass storage devices without a corresponding decrease in reliability. RAID technology may employ a plurality of hard disk drives (HDDs), in combination with data redundancy, parity information and/or other form(s) of error checking information, or a combination thereof, to provide a "virtual disk." User data and error checking information may be distributed among the plurality of HDDs of a virtual disk.

As a common example, a RAID 5 virtual disk spanning N HDDs, where N is an integer greater than two (2), stores a block of user data of B bytes in segments or stripes of size S, where S=B/(N−1), where the stripe includes parity data on one (1) of the physical drives and user data on each of the remaining N−1 drives. The physical drive on which the parity data is stored changes from one stripe to the next so that each physical drive stores approximately 1/N of the user data and 1/N of the parity data and where the ratio of user data to parity data is (N−1):1.

RAID-based storage systems may employ one or more redundant physical storage devices that are available to store data from a physical storage device that has exhibited one or more failures. Because these redundant physical storage devices are generally configured such that they can be swapped into a given virtual disk without powering down and without reloading an operating system, they may be referred to herein as hot spare drives or, more simply, hot spares (HSPs). A virtual disk that includes one or more HSPs may be referred to herein as a redundant virtual disk.

When a redundant virtual RAID disk transitions to a DEGRADED state, e.g., due to detection of an unrecoverable error on one of the physical drives, a rebuild process involving the hot spare drive may be initiated to restore the virtual RAID disk to a NORMAL state. Generally, the rebuild process requires the storage controller to retrieve data from each of the non-failing physical drives, compute the data that was stored on the physical drive that failed, and store the resulting data on the hot spare drive. Those of ordinary skill in the field of mass storage systems will readily appreciate that a rebuild process can be slow and can consume a significant portion of the storage controller's processing bandwidth.

SUMMARY

Disclosed subject matter address problems associated with processes for rebuilding data in degraded virtual RAID disks.

In accordance with disclosed subject matter, a storage management method includes receiving, by a host system, a degrade signal indicating a DEGRADED state of a virtual disk mapped to or otherwise associated with the host. Responsive to receiving the degrade signal, rebuild-flush operations may be performed prior to actual rebuilding.

The rebuild-flush operations may include writing, to the virtual disk and also to the HSP associated with the virtual disk, valid-modified, i.e., "dirty" data cached in a host storage cache associated with the virtual disk. In contrast, valid-unmodified "clean" storage cache data associated with the virtual disk, may be written to the HSP only.

Upon completion of the rebuild-flush operations, the DEGRADED virtual disk may be rebuilt by performing rebuild operations for each virtual disk logical block address (LBA), i.e., each LBA included in the virtual disk. The rebuild operations may include simply skipping to the next LBA for any virtual disk LBA cached, whether valid-unmodified or valid modified, in the host storage cache. By skipping over any cached LBAs associated with the DEGRADED virtual disk, substantial reduction of rebuild time is potentially achievable with the amount of potential savings in rebuild time increasing with the size of the host storage cache.

For un-cached virtual disk LBAs, i.e., virtual disk LBAs that do not correspond to valid data stored in the host storage cache, rebuilding may include regenerating a stripe of user data associated with the LBA and storing the stripe of rebuilt user data resulting from said regenerating to the HSP.

To facilitate the rebuild-flush operations, hash table data indicating virtual disk LBAs cached in the host storage cache may be maintained. The hash table data may be maintained in two hash tables, one for valid-unmodified cache data and one for valid-modified cache data. In these embodiments, a storage driver may distinguish between valid-modified data, which may be flushed to the virtual disk as well as the HSP, and valid-unmodified data, which may be stored to the HSP only, i.e., not stored to the virtual disk as part of the rebuild.

The rebuild-flush operations may include locking storage cache lines associated with the virtual disk to prevent eviction during rebuild, generating a rebuild-flush I/O request targeting the virtual disk LBAs. Generating the rebuild-flush I/O request may include setting, in an I/O structure corresponding to the rebuild-flush I/O request, a rebuild-flush flag indicating whether a corresponding virtual disk LBA is a valid-unmodified LBA. The rebuild-flush I/O request may be submitted to flush valid data in the host storage cache associated with the DEGRADED virtual disk instead of rebuilding and recalculating the applicable LBAs.

Processing of the rebuild-flush I/O request may be performed by storage controller code in accordance with the flush-rebuild flag to write valid-unmodified virtual disk LBAs to the HSP and to write valid-modified virtual disk LBAs to the virtual disk and the HSP.

Handling of ongoing I/O transactions may continue while the rebuilding of the DEGRADED virtual disk is in progress. During rebuilding, the DEGRADED virtual disk may be characterized as comprised of three rebuild regions: completed rebuild regions, current rebuild regions, and pending rebuild regions. I/O transaction handling during rebuilding may be performed in accordance with the rebuild region targeted by the I/O transaction. If the I/O transaction LBA maps to a completed rebuild region, the I/O transaction may be completed in conventional RAID or redundant manner. If the I/O transaction LBA maps to a current rebuild region, the I/O transaction may be queued to execute when rebuilding of the current rebuild region completes. For I/O transaction LBAs that map to a pending rebuild region, the transaction may be processed "pre-rebuild" by determining whether the I/O transaction LBA matches an LBA in the hash table, i.e., whether the I/O transaction LBA is a cached LBA. If so, processing the I/O transaction may include processing the transaction by direct access of the applicable physical disks including the applicable hard disk drive(s) and the HSP. If the I/O transaction LBA does not match a hash table LBA, the transaction may be processed by regenerating a stripe associated with the I/O transaction LBA before processing the I/O transaction.

By flushing valid host cache data back to the virtual disk and the HSP following a degrade event and before rebuild starts, the rebuild assist module beneficially reduces rebuild time by a potentially substantial amount by reducing the amount of storage that must be rebuilt and recalculated.

In accordance with disclosed subject matter, an information handling system includes a central processing unit, a storage cache device for use in providing a host storage cache for a virtual disk, and a memory including processor-executable storage instructions. The instructions, when executed by the CPU, may cause the CPU to perform all or some of the method operations described above. The host storage cache may comprise a solid state drive storage cache device and storage cache metadata. The virtual disk may be a RAID virtual disk implemented on a group of HDDs and exposed to the host by a storage controller that supports a hot spare drive.

In accordance with still other disclosed subject matter, an information handling platform includes a host information handling system as described in the preceding paragraph in combination with a logical storage volume or LUN (logical unit number) exposed by a storage controller and a plurality of hard disk drives and a host spare drive. The information handling platform may flush a host storage cache as described with respect to disclosed methods following a degrade event, in which a hard disk drive reports an unrecoverable error, and prior to rebuilding the entire degraded disk.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a block diagram of hash tables for determining which logical block addresses are cached in a storage cache; and FIG. 4 illustrates a flow diagram of a method of handling I/O transactions while a degraded virtual disk is rebuilding.

DETAILED DESCRIPTION

Figure 1:
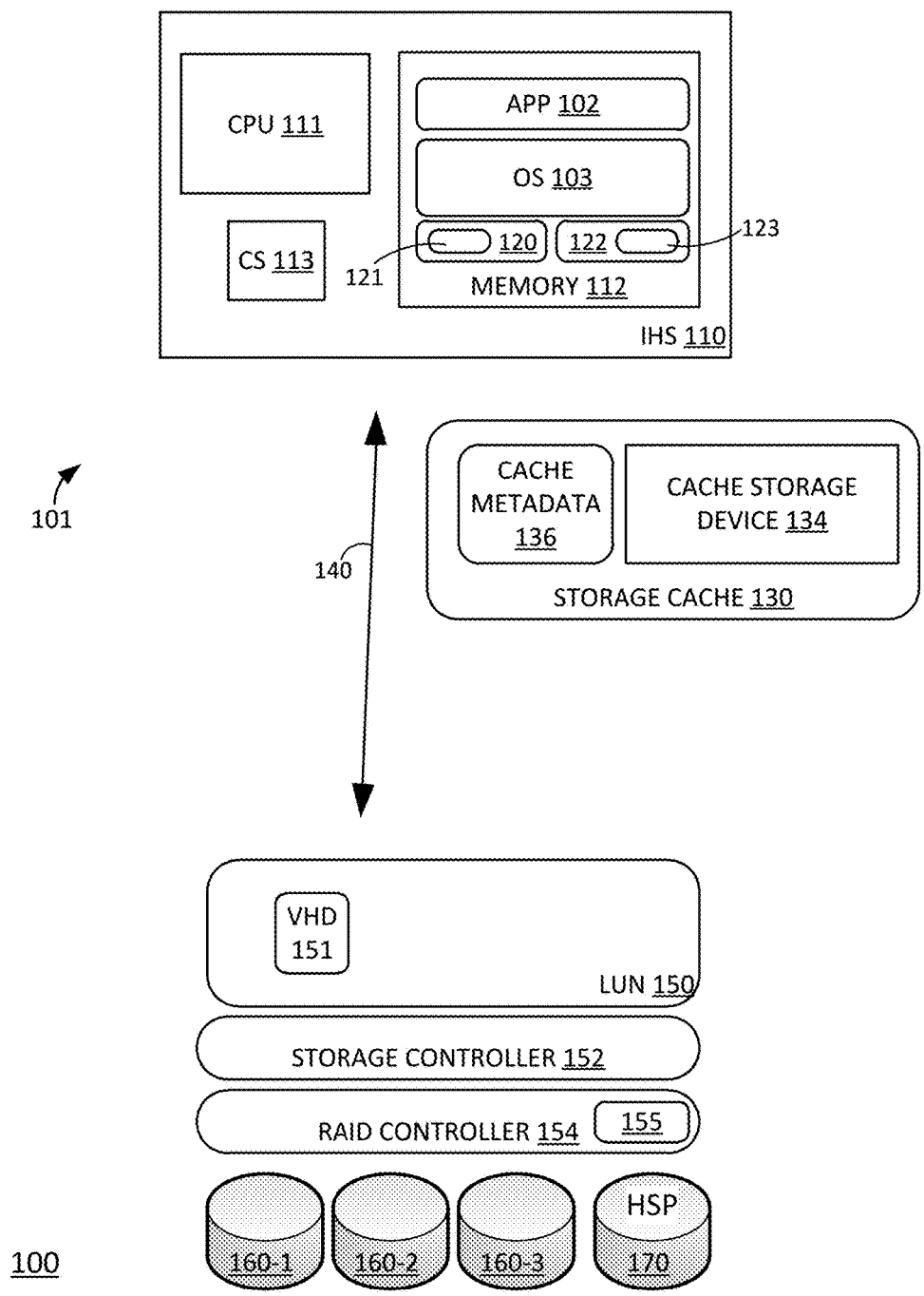
FIG. 1 illustrates a block diagram of an information handling system platform including an information handling system and a virtualized storage resource.

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the disclosed subject matter. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware described herein, are exemplary only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of disclosed embodiments to embodiments in which different element, feature, protocol, or concept names are utilized. Thus, each term utilized herein is to be given its broadest interpretation given the context in which that term is utilized.

Information handling systems that include or are coupled to a redundant virtual RAID disk may be configured as a host system that interfaces with a storage subsystem. The host may employ a storage cache, analogous to an L1 data cache employed by a processor, that stores recently accessed and/or frequently accessed user data in a storage medium that has substantially lower access latency than the virtual RAID disk. Non-limiting examples of devices suitable for providing a host cache include, dynamic random access memory (DRAM), non-volatile dual in-line memory module (NVDIMM), and non-volatile memory express (NVMe) devices.

When an IHS that includes a storage subsystem and a host cache initiates a rebuild, the host cache is likely to include user data that is valid. Typically, however, a conventional rebuild process only accesses data from the virtual RAID disk. It is not unusual for an IHS initiating a rebuild of a degraded 1 TB HDD to have, as an example, 100 GB of valid user data stored in a host cache.

The IHS may include rebuild assistance modules, implemented in software, hardware, firmware, or a combination thereof, to achieve faster rebuild processes. The rebuild assist modules may be configured to execute at the cache layer or in RAID drivers and controllers, e.g., as part of a driver for the host cache. When a virtual RAID disk transitions to DEGRADED, the storage controller may propagate the event to the host cache module. The rebuild assist module may detect the event and lock all valid host cache data associated with the DEGRADED virtual RAID disk. The rebuild assist module may then flush valid host cache data associated with the virtual RAID disk before proceeding with a rebuild. Flushing the host cache of valid data associated with a particular virtual RAID disk may include flushing valid-unmodified data to the HSP and flushing valid-modified data to the physical drives of the virtual disk as well as to the HSP. The rebuild assist module may be particularly effective in reducing rebuild time when the storage cache resides on the host system and employs solid state memory or storage including, as examples, DRAM, NVDIMM, or NVMe.

FIG. 1 illustrates an information handling system platform 100, also referred to herein as information handling platform 100, suitable for implementing an efficient rebuild process for a degraded virtual disk. The information handling platform 100 illustrated in FIG. 1 includes a host information handling system 101, also referred to herein as host 101, generating I/O transactions 140 targeting a LUN 150. The host 101 of FIG. 1 encompasses an application program 102 executing within an operating system (OS) 103 installed on an information handling system 110.

The information handling system 110 includes one or more central processing units (CPUs) 111 coupled to system memory 112, in which the application program 102 and the operating system 103 have been stored for execution by CPU(s) 111. The information handling system 110 illustrated in FIG. 1 further includes a chip set 113 that provides one or more I/O interfaces that couple external devices including the external storage represented by LUN 150 to host 101.

The LUN 150 illustrated in FIG. 1 is implemented on a group of three (3) hard disk drives 160 and an HSP 170. A storage controller 152 exposes LUN 150 and virtual disk 151 to host 101.

The virtual disk 151 of FIG. 1 is a RAID virtual disk maintained by a RAID controller 154 underlying storage controller 152. The RAID controller 154 may support any one or more levels of RAID appropriate for the application and configuration. The RAID controller 154 of FIG. 1 may, as a non-limiting example, implement virtual disk 151 as a RAID 5 virtual disk employing the three HDDs 160 with two of the three HDDs 160 storing data and the remaining HDD 160 storing parity for any given data stripe, where the HDD 160 containing parity rotates among the three HDDs 160 depending on the stripe.

The information handling platform 100 illustrated in FIG. 1 includes a storage cache 130 configured to cache I/O transactions 140 generated by host 101. The storage cache 130 of FIG. 1 includes one or more cache storage devices 134 and cache metadata 136 maintained by a storage cache module 120 in operating system 103. Each of the one or more storage cache devices 134 may be implemented with a storage medium having a significantly lower access latency than the HDDs 160 that back virtual disk 151. In at least one embodiment, each one or more storage cache device 134 comprises a nonvolatile memory express (NVMe), peripheral component interconnect express (PCIe) solid state drive (SSD).

Due to a higher per-byte cost of solid state devices relative to HDDs, the storage capacity of storage cache 130 has, historically, been significantly lower than the storage capacity of LUN 150. Anecdotal evidence, however, suggests that installations with oversized storage caches, i.e., installations employing significantly higher cache/HDD ratios, are becoming increasingly common. Coupled with the ever-increasing capacities of even modestly implemented LUNs, the resulting storage cache may be quite large.

The reliability of HDDs such as the HDDs 160 of FIG. 1 is inherently lower than the reliability of the solid state devices in which storage cache 130 is typically implemented. While RAID configurations address the most significant risk associated with an HDD failure, i.e., loss of user data, the time required to rebuild a RAID virtual disk following an HDD degrade is undesirably high and will become even more so as terabyte scale HDDs give way to petabyte scale HDDS and beyond. The information handling platform 100 of FIG. 1 addresses the rebuild delay associated with large capacity RAID virtual disks at least in part by leveraging the potentially sizeable amount of valid data residing in the storage cache 130 to reduce the number of HDD accesses and the number of parity calculations the rebuild process must perform.

In the following description, each individually flushable segment or grain of user data stored in storage cache 130 may be referred to as a cache line. The byte size of a cache line is an implementation detail that may vary among different embodiments. The cache line size may be selected in conjunction with the size of individually addressable segments of storage in HDDs 160, e.g., the amount of storage associated with a single LBA. Each LBA may represent 512 bytes, 4 Kbytes, or another suitable value. In at least one embodiment, each cache line has capacity to store N LBAs where N is an integer greater than 0. For purposes of the following discussion, N is assumed to be 1 unless indicated otherwise.

With respect to rebuilding DEGRADED virtual disks, each cache line may be characterized in one of three cache coherency states: (1) valid-unmodified, (2) valid-modified, and (3) invalid. Consistent with this terminology, storage cache 130 may be described as typically containing, at any moment in time, at least some invalid cache data (ICD) and at least some valid cache data, including at least some valid-unmodified data and at least some valid-modified data.

As previously described, the information handling platform 100 of FIG. 1 enables and supports storage cache 130 and virtual disk 151 with a storage cache module 120 and a RAID controller driver 122 underlying OS 103 and with the RAID controller 154 underlying storage controller 152. To leverage valid data stored in storage cache 130 to reduce rebuild time following a degrade of virtual disk 151, the illustrated information handling platform 100 provides rebuild assistance modules for each of these three resources. Accordingly, FIG. 1 illustrates three rebuild assistance modules including a rebuild assist module 121 within storage cache module 120, a driver rebuild module 123 within RAID controller driver 122, and a controller rebuild module 155 within RAID controller 154. A description of operations performed by these modules, in conjunction with other resources of the information handling platform 100, is illustrated in FIG. 2.

FIG. 2 illustrates a flow diagram of a process 200 for providing rebuild assistance to a storage controller rebuilding a virtual disk 151 following a virtual disk degrade. As used herein, a degrade or degrade event refers to a state transition of virtual disk 151 from NORMAL to DEGRADED, where the DEGRADED state is a state in which virtual disk 151 has at least one fault or error and from which virtual disk 151 can be rebuilt, i.e., restored to a functional state with no loss of user data. In the RAID 5 implementation of virtual disk 151 suggested in FIG. 1, a degrade of virtual disk 151 may occur following detection of an unrecoverable error on one of the underlying HDDs 160. When an HSP 170 is available in conjunction with HDDs 160, the virtual disk 151 may be restored to a NORMAL RAID 5 state of redundancy.

The process 200 illustrated in FIG. 2 begins whenever the state of a virtual disk 151 transitions (202) to DEGRADED. The storage controller 152 may send (204) a degrade notification to host 101. In some embodiments, the degrade notification may include information identifying the degraded virtual disk 151 associated with the degrade event.

The process 200 of FIG. 2 responds to receiving the degrade notification by "locking" (206) valid storage cache lines corresponding to the degraded virtual disk. Locking storage cache lines containing valid data, whether modified or unmodified, prevents the applicable cache lines from being evicted from the host cache while the rebuild is in progress. Each storage cache line of storage cache 130 may include, within its metadata 136, one or more fields or attributes (not explicitly depicted). The metadata attributes may include an eviction attribute indicating whether the corresponding cache line in storage cache 130 might be invalidated or otherwise evicted. The eviction attribute may be indicated in one or more bits of information in metadata 136. In a single bit embodiment of the eviction attribute, the attribute simply identifies cache lines ineligible to be invalidated or otherwise evicted.

The RAID controller driver 122 may maintain one or more hash table data structures mapping the LBAs of the degraded virtual disk to storage cache lines containing valid cache data. Referring to FIG. 3, the hash tables 301 of FIG. 3 distinguish between storage cache lines containing valid-unmodified (VU) data and storage cache lines containing valid-modified (VM) data by including a first hash table 301-1 identifying degraded virtual disk LBAs cached in the host storage cache with VU data and a second hash table 301-2 identifying degraded virtual disk LBAs cached in the host storage cache with VM data. Each hash table 301 maps an LBA to a corresponding cache line of the host storage cache, i.e., the host storage cache entry corresponding to the applicable LBA. As the entries in the host storage cache change, the hash table may be updated to reflect the current state of the storage cache at any time.

Returning to FIG. 1, in at least one embodiment, RAID controller driver 122 also defines a special purpose flag, referred to herein as the rebuild-flush flag, in the request structure used for I/O transactions 140, e.g., a bio struct (Block I/O structure) flag in embodiments employing a Linux-based OS 103. The rebuild-flush flag may be asserted to distinguish between storage cache lines that contain VU data and storage cache lines that contain VM data.

After locking valid cache lines associated with the degraded virtual disk, the process 200 illustrated in FIG. 2 sets (operation 208) the rebuild-flush flag and initiates (operation 210) a rebuild-flush I/O request to write VU data associated with the degraded virtual disk 151 to the HSP 170 and to write back VM data associated with the degraded virtual disk 151 to HDDs 160 as well as HSP 170. For each storage cache line associated with the degraded virtual disk 151, the rebuild-flush I/O request distinguishes (operation 212) between cache lines containing VU data and cache lines containing VM data.

For storage cache lines associated with the degraded virtual disk 151 containing VU data, rebuild assist module 121 sends (operation 220) a special purpose control command, referred to herein as the VU transfer command, to the driver rebuild module 123 of RAID controller driver 122 and updates (operation 214) a Flush List that contains the LBAs of all valid cache data, whether modified or unmodified, flushed back to LUN 150.

The VU transfer command is then processed (operation 222) by the driver rebuild module 123 and the VU data is sent (operation 224) to the controller rebuild module 155 of RAID controller 154.

For the storage cache lines associated with degraded virtual disk 151 that contain VM data, the rebuild assist module 121 issues a write (operation 230) of VM data associated with the degraded virtual disk 151 and updates (operation 214) the Flush List with the corresponding LBAs. The driver rebuild module 123 responds to the VM write by sending (operation 232) the VM data to the controller rebuild module 155 in RAID controller 154.

The RAID controller 154 writes (operation 240) VM data to virtual disk 151 and updates (operation 242) the hash table. The RAID controller 154 also writes (operation 244) VU data to HSP 170, and only to HSP 170, and updates the hash table. Once the rebuild-flush I/O completes and all valid cached data associated with the degraded virtual disk 151 has been transferred (operation 246), the process 200 illustrated in FIG. 2 resumes (operation 250) rebuilding the degraded virtual disk 151.

In at least one embodiment, the rebuild following the rebuild-flush operations described above includes an iterative process in which each LBA associated with the degraded virtual disk 151 is checked against the hash table. If (operation 252) the current LBA is found in the hash table, the LBA was processed during the rebuild-flush operations described above and the applicable user data was stored to the HSP 170. Accordingly, no further action is required and processor 200 advances to the next LBA (operation 260) If on the other hand, the current LBA is not found in the hash table, data and parity are regenerated (operation 256) and written to HSP 170 before advancing to the next LBA. This processing continues until all LBAs associated with the degraded virtual disk 151 have been processed against the hash table, at which point the rebuild has completed (block 262).

FIG. 4 illustrates a method 400 for performing I/O transactions while the previously described rebuilding is in progress. Whenever an I/O transaction is detected (operation 402) while a rebuilding of a degraded virtual disk is in progress, a determination (operation 404) of whether the transaction is a read or a write is made. If the I/O transaction is a read, a determination (operation 406) of whether the I/O transaction targets an LBA that has already been rebuilt as part of the rebuild flush is made, in which case the I/O is executed (operation 408) as if the array is in redundant mode.

If (operation 410) the I/O transaction targets a region currently being rebuilt, the I/O transaction is serialized (operation 412) for execution after the rebuild completes. If the I/O targets a pending rebuild region, i.e., a region yet to be rebuilt, method 400 proceeds to operation 414 where a determination of whether the applicable LBA is in the hash table is made. If so, method 400 performs the I/O transaction by accessing (operation 416) physical disks including the HSP 170. If the I/O region targets an LBA that is not in the hash table, the I/O transaction may be performed by regenerating (operation 420) the data, completing the I/O request, and writing the data to the HSP 170.

If the I/O request is a write request, the method 400 illustrated in FIG. 4 branches from operation 404 to operation 430 where a determination is made of whether the I/O transaction targets an LBA that has already been rebuilt as part of the rebuild flush, in which case the I/O is executed (operation 432) as if the array is in redundant mode. If (operation 434) the I/O transaction targets a region currently being rebuilt, the I/O transaction is serialized (operation 436) for execution after the rebuild completes.

If the I/O targets a portion of disk yet to be rebuilt, method 400 branches from operation 434 to operation 438 where the method determines whether the requested I/O region is part of the rebuild-flush hash table. If so, the method 400 illustrated in FIG. 4 performs (operation 440) a write/modify of the data by accessing HSP 170 and member physical disks and thereafter acknowledging the I/O. If the I/O transaction is not in the hash table, the illustrated method 400 applies (operation 412) normal regeneration operations and completes the I/O request, writes the generated stripe to HSP 170 and updates the hash table.

Figure 2A:
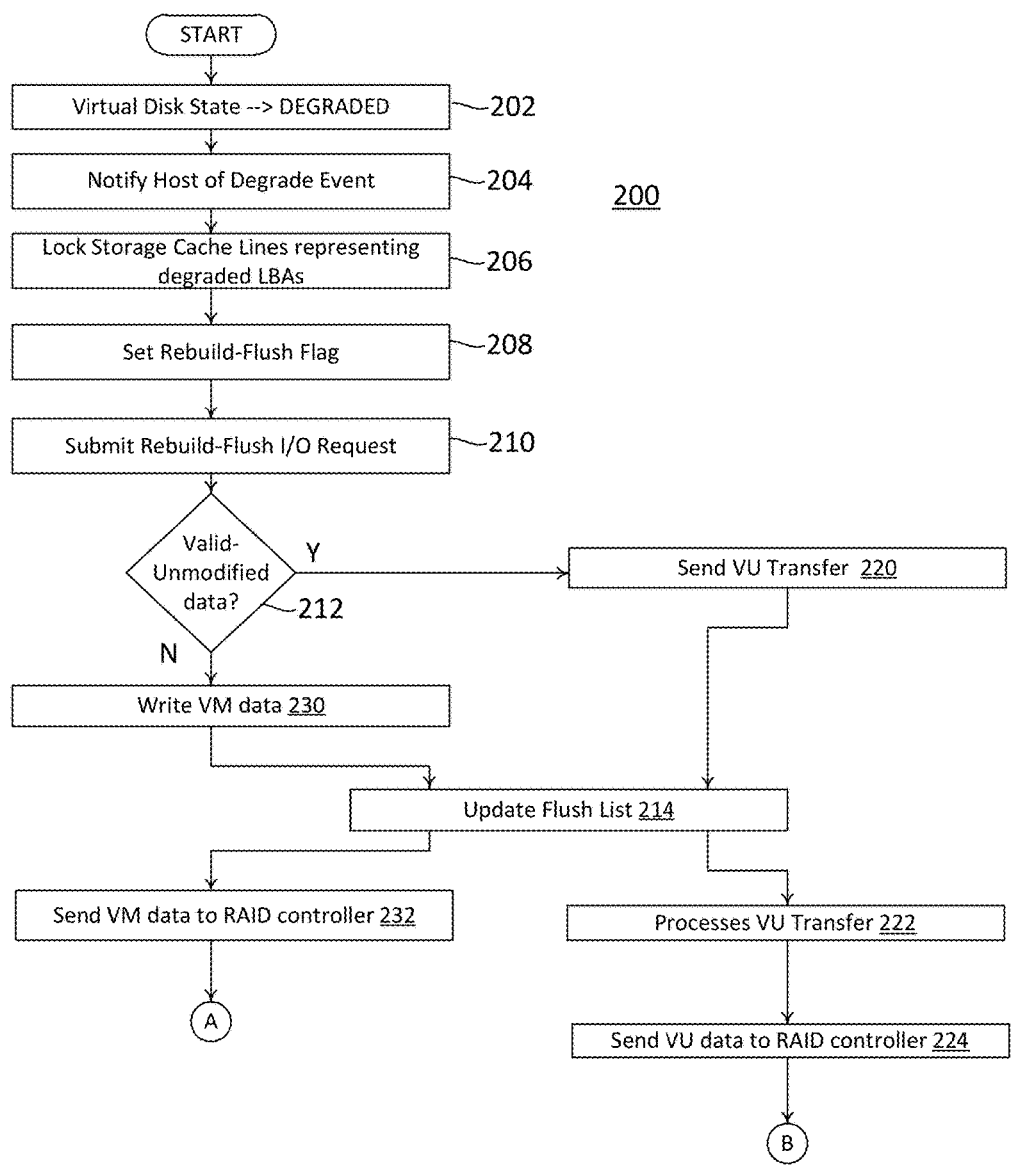
FIG. 2A and FIG. 2B illustrate a flow diagram of a method of rebuilding a degraded virtual disk.
Figure 2B:
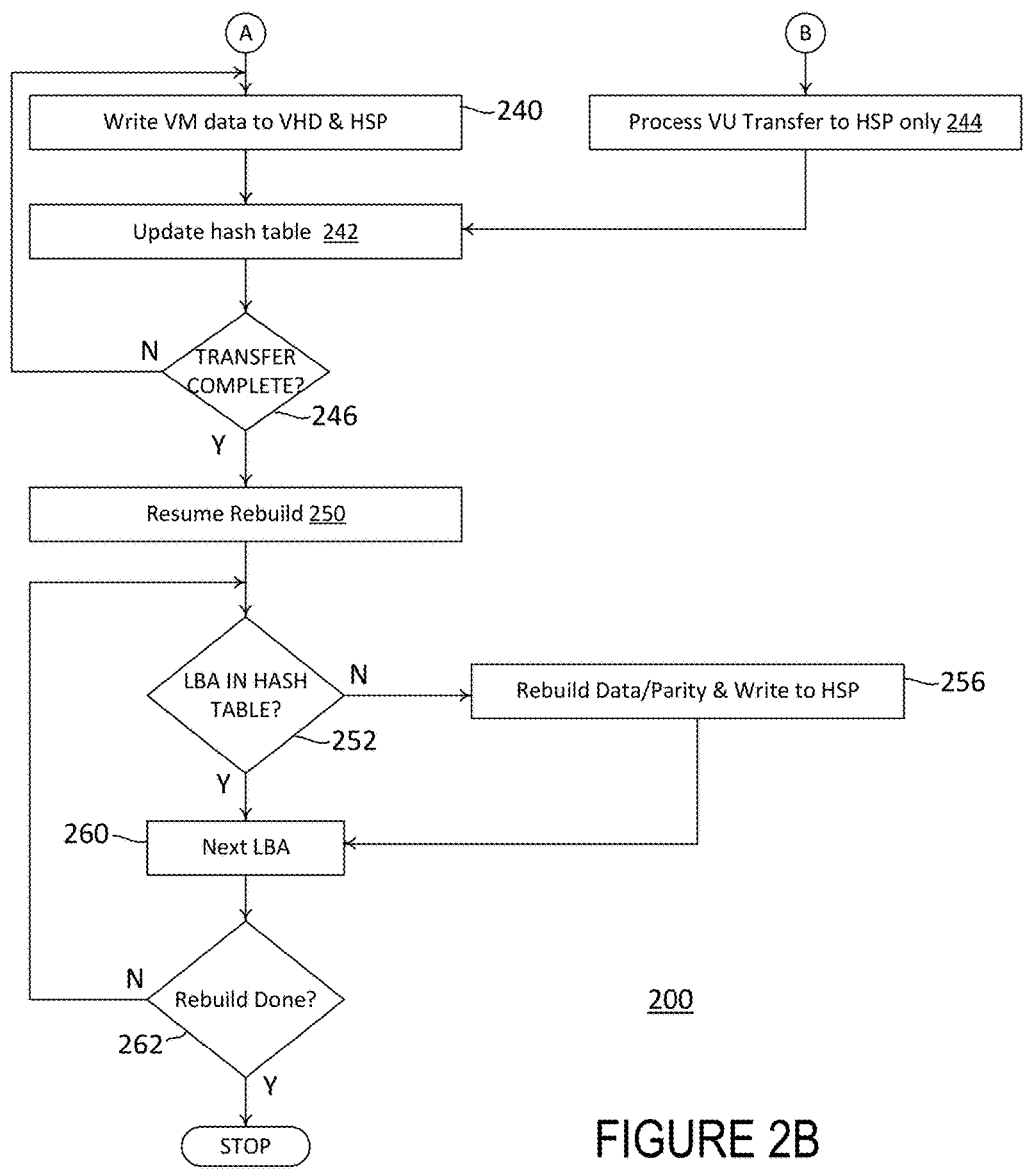

Any one or more processes or methods described above, including processes and methods associated with FIGS. 2A, 2B, and 4 flow diagrams, may be embodied as a computer readable storage medium or, more simply, a computer readable medium including processor-executable program instructions, also referred to as program code or software, that, when executed by the processor, cause the processor to perform or otherwise result in the performance of the applicable operations.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. Information handling systems may include two or more different types of computer readable media and, in such systems, program code may be stored, in whole or in part, in two or more different types of computer readable media.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A storage management method, comprising:
    receiving, by a host, a degrade signal indicating a DEGRADED state of a virtual disk associated with the host;
    responsive to receiving the degrade signal, performing rebuild-flush operations comprising:
        writing, to the virtual disk and to a hot spare drive (HSP) associated with the virtual disk, valid-modified data, stored in a host storage cache, associated with the virtual disk; and
        writing, to the HSP, valid-unmodified data, stored in the host storage cache, associated with the virtual disk; and
    rebuilding the virtual disk, said rebuilding including, for each virtual disk logical block address (LBA):
        responsive to determining that the virtual disk LBA corresponds to valid cache data in the host storage cache, skipping to a next virtual disk LBA; and
        responsive to determining that the virtual disk LBA does not correspond to valid cache data in the host storage cache:
            regenerating user data associated with the LBA; and
            storing rebuilt user data resulting from said regenerating to the HSP.

2. The method of claim 1, further comprising:
    maintaining hash table data indicating virtual disk LBAs cached in the host storage cache.

3. The method of claim 2, wherein maintaining the hash table data includes:

maintaining a valid-unmodified hash table indicating virtual disk LBAs having corresponding valid-unmodified entries in the host storage cache; and
maintaining a valid-modified hash table indicating virtual disk LBAs having corresponding valid-modified entries in the host storage cache.

4. The method of claim 3, wherein performing the rebuild-flush operations comprises:
locking storage cache lines associated with the virtual disk to prevent eviction; and
generating a rebuild-flush I/O request corresponding to the virtual disk LBAs, said generating including:
setting, in an I/O structure corresponding to the rebuild-flush I/O request, a rebuild-flush flag indicating whether a corresponding virtual disk LBA is a valid-unmodified LBA; and
submitting the rebuild-flush I/O request.

5. The method of claim 4, further comprising:
processing, by a storage driver, the rebuild-flush I/O request in accordance with the flush-rebuild flag, said processing including:
writing valid-unmodified virtual disk LBAs to the HSP; and
writing valid-modified virtual disk LBAs to the virtual disk and to the HSP.

6. The method of claim 2, further comprising:
handling, while said rebuilding is in progress, an I/O transaction targeting an I/O transaction LBA, said handling comprising:
determining whether an LBA associated with the I/O transaction maps to a completed rebuild region of the virtual disk, a current rebuild region of the virtual disk, or a pending rebuild region of the virtual disk;
responsive to determining that the I/O transaction LBA maps to a completed rebuild region, executing the I/O transaction; and
responsive to determining that the I/O transaction LBA corresponds to a current rebuild region, queuing the I/O transaction to execute when rebuilding of the current rebuild region completes.

7. The method of claim 6, wherein handling the I/O transaction further comprises:
responsive to determining that the I/O transaction LBA corresponds to a pending rebuild region, determining whether the I/O transaction LBA matches an LBA in the hash table data;
responsive to determining that the I/O transaction LBA matches a hash table LBA, processing the I/O transaction by accessing:
hard disk drives associated with the virtual disk; and the HSP; and
responsive to determining that the I/O transaction LBA does not match a hash table LBA, regenerating a stripe associated with the I/O transaction before processing the I/O transaction.

8. An information handling system, comprising:
a central processing unit (CPU);
a storage cache device for use in providing a host storage cache for a virtual disk;
a memory including processor-executable storage instructions, that, when executed by the CPU, cause the CPU to perform operations comprising:
receiving a degrade signal indicating a DEGRADED state of the virtual disk associated with the host storage cache;
responsive to receiving the degrade signal, performing rebuild-flush operations comprising:
writing, to the virtual disk and to a hot spare drive (HSP) associated with the virtual disk, valid-modified data stored in a host storage cache and associated with the virtual disk; and
writing valid-unmodified data associated with the virtual disk to the HSP; and
rebuilding the virtual disk, said rebuilding including, for each virtual disk logical block address (LBA):
responsive to determining that the virtual disk LBA does not correspond to valid cache data in the host storage cache:
regenerating user data associated with the LBA; and
storing rebuilt user data resulting from said regenerating to the HSP.

9. The information handling system of claim 8, wherein the host storage cache comprises a solid state drive storage cache device and storage cache metadata and wherein the virtual disk is a RAID virtual disk implemented on a group of hard disk drives.

10. The information handling system of claim 9, wherein the operations include:
maintaining a valid-unmodified hash table indicating virtual disk LBAs having corresponding valid-unmodified entries in the host storage cache; and
maintaining a valid-modified hash table indicating virtual disk LBAs having corresponding valid-modified entries in the host storage cache.

11. The information handling system of claim 10, wherein performing the rebuild-flush operations comprises:
locking storage cache lines associated with the virtual disk to prevent eviction; and
generating a rebuild-flush I/O request corresponding to the virtual disk LBAs, said generating including:
setting, in an I/O structure corresponding to the rebuild-flush I/O request, a rebuild-flush flag indicating whether a corresponding virtual disk LBA is a valid-unmodified LBA; and
submitting the rebuild-flush I/O request.

12. The information handling system of claim 11, wherein the operations include:
processing, by a storage driver, the rebuild-flush operation in accordance with the flush-rebuild flag, said processing including:
writing valid-unmodified virtual disk LBAs to the HSP; and
writing valid-modified virtual disk LBAs to the virtual disk and the HSP.

13. The information handling system of claim 12, wherein the operations include:
handling an I/O transaction while said rebuilding is in progress, said handling comprising:
determining whether an LBA associated with the I/O transaction maps to a completed rebuild region of the virtual disk, a current rebuild region of the virtual disk, or a pending rebuild region of the virtual disk;
responsive to determining that the I/O transaction LBA maps to a completed rebuild region, executing the I/O transaction; and
responsive to determining that the I/O transaction LBA corresponds to a current rebuild region, queuing the I/O transaction to execute when rebuilding of the current rebuild region completes.

14. The information handling system of claim 13, wherein handling the I/O transaction further comprises:

responsive to determining that the I/O transaction LBA corresponds to a pending rebuild region, determining whether the I/O transaction LBA matches an LBA in either of the hash tables;

responsive to determining that the I/O transaction LBA matches a hash table, LBA processing the I/O transaction by accessing:
hard disk drives associated with the virtual disk; and
the HSP;

responsive to determining that the I/O transaction LBA does not match a hash table LBA, regenerating a stripe associated with the I/O transaction before processing the I/O transaction.

15. An information handling platform, comprising:
a logical unit number (LUN) comprising:
   a plurality of hard disk drives; and
   a storage controller configured to expose a virtual disk;
an information handling system, comprising:
   a central processing unit (CPU);
   a storage cache device for use in providing a host storage cache for the virtual disk; and
   a memory including processor-executable storage instructions, that, when executed by the CPU, cause the CPU to perform operations comprising:
      receiving a degrade state signal indicating a DEGRADED state of the virtual disk;
      responsive to receiving the degrade signal, performing rebuild-flush operations comprising:
         writing, to the virtual disk and to a hot spare drive (HSP) associated with the virtual disk, valid-modified data, in the host storage cache, associated with the virtual disk; and
         writing valid-unmodified data, in the host storage cache, associated with the virtual disk to the HSP;
      rebuilding the virtual disk, said rebuilding including, for each virtual disk logical block address (LBA):
      skipping to a next virtual disk LBA responsive to determining that a current virtual disk LBA is cached in the host storage cache; and
      regenerating a stripe corresponding to the virtual disk LBA responsive to determining that the current virtual disk LBA is not cached in the host storage cache.

16. The information handling platform of claim 15, wherein the storage controller is configured to expose a RAID LUN to the host.

17. The information handling platform of claim 16, wherein the RAID LUN comprises a RAID 5 LUN including N HDDs where N is an integer greater than 2.

18. The information handling platform of claim 17, further comprising:
maintaining a valid-unmodified hash table indicating virtual disk LBAs having corresponding valid-unmodified entries in the host storage cache;
maintaining a valid-modified hash table indicating virtual disk LBAs having corresponding valid-modified entries in the host storage cache; and
locking storage cache lines associated with the virtual disk to prevent eviction.

19. The information handling platform of claim 15, further comprising:
generating a rebuild-flush I/O request corresponding to the virtual disk LBAs, said generating including:
   setting, in an I/O structure corresponding to the rebuild-flush I/O request, a rebuild-flush flag indicating whether a corresponding virtual disk LBA is a valid-unmodified LBA; and
   submitting the rebuild-flush I/O request.

20. The information handling platform of claim 19,
processing, by a RAID storage driver, the rebuild-flush I/O request in accordance with the flush-rebuild flag, said processing including:
   writing valid-unmodified virtual disk LBAs to the HSP; and
   writing valid-modified virtual disk LBAs to the virtual disk and the HSP.

* * * * *